Patented Aug. 16, 1932

1,871,852

UNITED STATES PATENT OFFICE

GEORG KALISCHER, OF FRANKFORT-ON-THE-MAIN, AND ERNST HONOLD, OF FRANK-FORT-ON-THE-MAIN-FECHENHEIM, GERMANY, ASSIGNORS TO GENERAL ANILINE WORKS, INC., OF NEW YORK, N. Y., A CORPORATION OF DELAWARE

WOOL DYESTUFFS AND PROCESS OF MAKING SAME

No Drawing. Application filed April 24, 1930, Serial No. 447,093, and in Germany May 18, 1929.

This invention relates to new wool dyestuffs which correspond to the general formula:

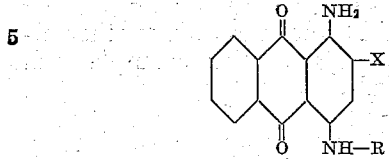

wherein X means hydrogen or a sulfonic acid group and R a sulfonated aromatic radical of the group consisting of

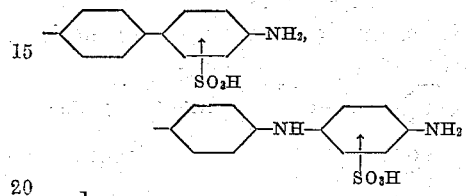

and

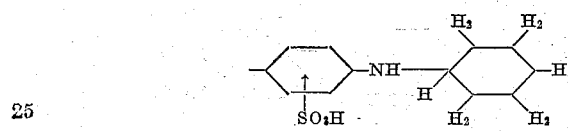

These dyestuffs are obtained according to this invention by condensing 1-amino-4-halogeno-anthraquinone-2-sulfonic acid with an aromatic diamino-mono-sulfonic acid of the formula:

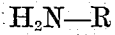

H$_2$N—R wherein R has the above signification, in an aqueous solution in the presence of an acid-binding agent and of a catalyst as for example copper or copper salt.

Of a special value are those of these dyestuffs which correspond to the general formula:

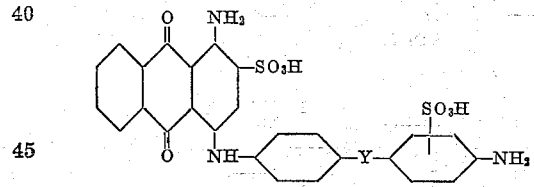

wherein Y means a C—C-bond or an iminogroup.

The smooth course of this reaction contrasts with the fact that mono-amino-arylsulfonic acids when condensed with 1-amino-4-halogeno-anthraquinone-2-sulfonic acid in an analogous manner, do not yield the corresponding 1-amino-4-sulfoarylamino-anthraquinone-2-sulfonic acids.

In order to produce dyestuffs containing no sulfonic group attached to the anthraquinone nucleus (X in the above formula being hydrogen) the condensation products may be treated with feebly acting alkaline reducing agents.

All these products are valuable wool-dyestuffs dyeing from an acid bath blue to grey to green shades of an excellent fastness.

Even the last mentioned dyestuffs containing only one sulfonic group show a sufficient solubility. Otherwise they show the same general properties as the first group of these dyestuffs.

In order to further illustrate our invention the following examples are given, the parts being by weight and all temperatures in centigrade degrees; but we wish it to be understood that our invention is not limited to the particular products nor to the reacting conditions mentioned therein.

Example 1

50 parts of the sodium salt of 1-amino-4-bromo-anthraquinone-2-sulfonic acid, 50 parts of benzidine-mono-sulfonic acid, 50 parts of soda, 5 parts of copper sulfate and 3000 parts of water are heated to 70–80° for several hours while stirring. From the intense greenish blue solution the condensation product is precipitated by the addition of common salt. The residue is treated with 3000 parts of water. The pure dyestuff is precipitated therefrom by the addition of 20 parts of concentrated hydrochloric acid and washed with water. It corresponds probably to the formula:

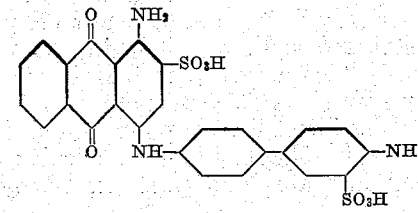

It dissolves easily in water with the addition of feeble alkalies as soda. Its solution in concentrated sulfuric acid shows a brownish tint which becomes blue by the addition of paraformaldehyde. It dyes wool from an acetic acid bath clear greenish blue shades of a good fastness to light and an excellent fastness to washing and perspiration.

*Example 2*

50 parts of the sodium salt of 1-amino-4-bromo-anthraquinone-2-sulfonic acid are condensed with 50 parts of the sodium salt of 4.4'-diamino-diphenylamine-2-sulfonic acid as described in Example 1. The dyestuff thus produced and purified by precipitating with hydrochloric acid corresponds probably to the formula:

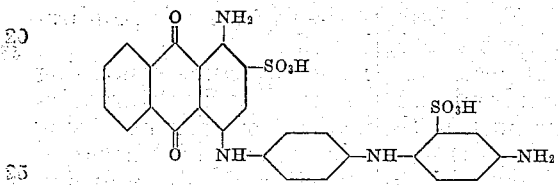

It dissolves easily in water, even without any addition of alkali and dyes wool from an acid bath greyish blue shades of an excellent fastness. Its solution in concentrated sulfuric acid shows a light blue tint becoming green by the addition of paraformaldehyde.

*Example 3*

50 parts of the sodium salt of 1-amino-4-bromo-anthraquinone-2-sulfonic acid are condensed with 50 parts of the sodium salt of 1-cyclohexylamino-4-aminobenzene-2-sulfonic acid in the manner described in Example 1. The new dyestuff is purified by precipitating its solution with common salt. It corresponds probably to the formula:

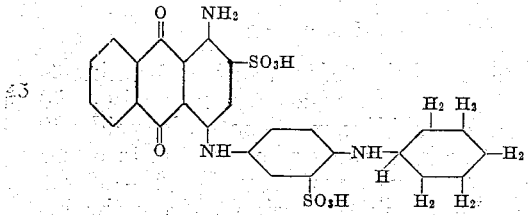

It dissolves in concentrated sulfuric acid to a light greenish blue solution becoming dark green when mixed with paraformaldehyde. It dyes wool from an acetic acid or sulfuric acid bath greenish blue shades.

*Example 4*

40 parts of the dyestuff prepared according to Example 1 are dissolved in 2000 parts of water and mixed with a solution of 120 parts of crystallized sodium sulfide in 300 parts of water. The mixture is boiled for 2–3 hours under a reflux condenser. Then the solution is filtered and precipitated with common salt. The residue is washed, again dissolved in water and precipitated by 10 parts of concentrated hydrochloric acid. The new dyestuff thus produced is nearly insoluble in cold water and is easily obtained in a pure state. It corresponds probably to the formula:

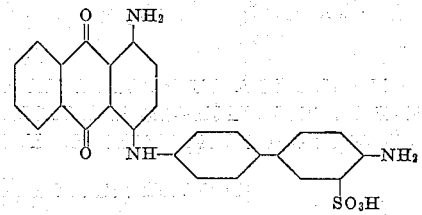

It dissolves easily in water with an addition of alkali carbonate or acetate or borax and dyes wool from an acid bath greenish blue shades of an excellent fastness to washing and milling.

The same dyestuff is obtained by treating the dyestuff of Example 1 with another alkaline reducing agent, as for example with glucose and alkali.

We claim:—

1. A process which comprises condensing 1-amino-4-bromo-anthraquinone-2-sulfonic acid with an aromatic diamino-mono-sulfonic acid of the general formula:

$$H_2 = N - R$$

wherein R means a sulfonated aromatic radical of the group consisting of

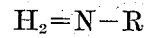
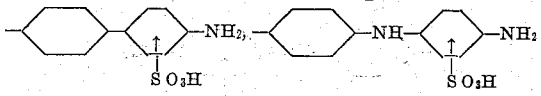
and
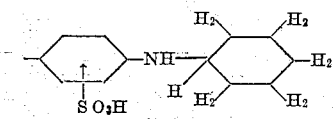

in an aqueous solution in the presence of an acid-binding agent and of a copper-containing catalyst, and acting on the condensation product thus formed with an alkaline reducing agent.

2. A process which comprises condensing 1-amino-4-bromo-anthraquinone-2-sulfonic acid with an aromatic diamino-mono-sulfonic acid of the general formula:

$$H_2 = N - R$$

wherein R means a sulfonated aromatic radical of the group consisting of

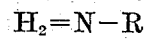
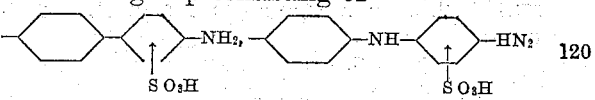
and
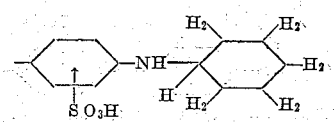

in an aqueous solution in the presence of an acid-binding agent and of a copper-containing catalyst.

3. A process which comprises condensing 1-amino-4-bromo-anthraquinone-2-sulfonic acid with an aromatic diamino-mono-sulfonic acid of the general formula:

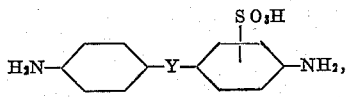

wherein Y means a C—C-bond or an imino group, in an aqueous solution in the presence of an acid-binding agent and of a copper-containing catalyst.

4. A process which comprises condensing 1-amino-4-bromo-anthraquinone-2-sulfonic acid with benzidine-mono-sulfonic acid of the formula:

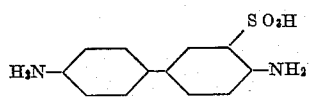

in an aqueous solution in the presence of an acid-binding agent and of a copper-containing catalyst.

5. As new compounds the acid wool dyestuffs corresponding to the probable general formula:

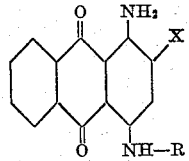

wherein X means hydrogen or a sulfonic acid group and R a sulfonated aromatic radical of the group consisting of

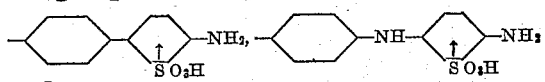

and

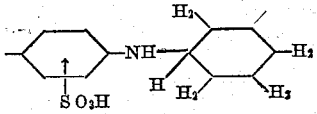

which compounds are intense colored powders dyeing wool from an acid bath blue to grey to green shades of an excellent fastness.

6. As new compounds the acid wool dyestuffs corresponding to the probable general formula:

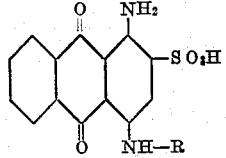

wherein R means a sulfonated aromatic radical of the group consisting of:

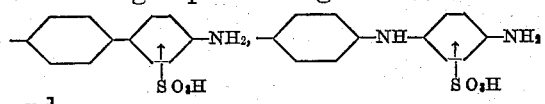

and

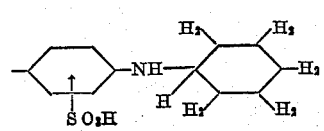

which compounds are intense colored powders dyeing wool from an acid bath blue to grey to green shades of an excellent fastness.

7. As new compounds the acid wool dyestuffs corresponding to the probable general formula:

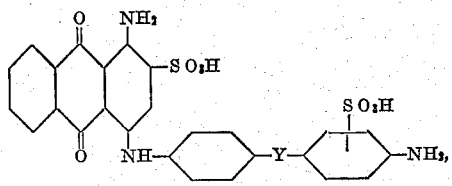

wherein Y means a C—C-bond or an imino-group, which compounds are intense colored powders dyeing wool from an acid bath greenish to greyish blue shades of an excellent fastness.

8. As a new compound the acid wool dyestuff corresponding to the probable formula:

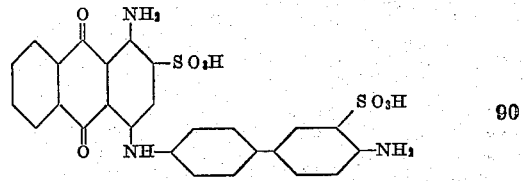

which compound dissolves easily in water with the addition of soda, dissolves in concentrated sulfuric acid to a brownish solution turning to blue when mixed with paraformaldehyde, and dyes wool clear greenish blue shades of a good fastness to light and an excellent fastness to washing and perspiration.

In testimony whereof, we affix our signatures.

GEORG KALISCHER.
ERNST HONOLD.